United States Patent
McCune et al.

(10) Patent No.: US 6,964,155 B2
(45) Date of Patent: Nov. 15, 2005

(54) TURBOFAN ENGINE COMPRISING AN SPICYCLIC TRANSMISSION HAVING BEARING JOURNALS

(75) Inventors: Michael E. McCune, Colchester, CT (US); Loc Q. Duong, South Windsor, CT (US)

(73) Assignee: United Technologies Corporation, Hartford, CT (US)

( * ) Notice: Subject to any disclaimer, the term of this patent is extended or adjusted under 35 U.S.C. 154(b) by 202 days.

(21) Appl. No.: 10/334,020

(22) Filed: Dec. 30, 2002

(65) Prior Publication Data

US 2004/0128978 A1 Jul. 8, 2004

(51) Int. Cl.$^7$ .................................. F02K 3/02
(52) U.S. Cl. .................. 60/226.1; 475/331; 384/297; 384/913
(58) Field of Search .............. 60/226.1; 475/331; 384/297, 913

(56) References Cited

U.S. PATENT DOCUMENTS

| | | | |
|---|---|---|---|
| 1,629,314 A | 5/1927 | Schein | |
| 2,154,532 A * | 4/1939 | Ryder | 475/332 |
| 3,001,840 A | 9/1961 | Musser | |
| 3,738,192 A * | 6/1973 | Belansky | 475/249 |
| 4,158,967 A * | 6/1979 | Vatterott | 74/410 |
| 4,700,583 A | 10/1987 | Hicks | |
| 4,836,758 A | 6/1989 | Elson et al. | |
| 4,857,377 A * | 8/1989 | Daimon et al. | 428/90 |
| 4,909,641 A | 3/1990 | Mc Kenzie | |
| 5,102,379 A | 4/1992 | Paglucia et al. | |
| 5,389,048 A * | 2/1995 | Carlson | 475/252 |
| 5,391,125 A * | 2/1995 | Turra et al. | 475/346 |
| 5,466,198 A | 11/1995 | McKibbin et al. | |
| 5,567,056 A | 10/1996 | Blase et al. | |
| 5,685,797 A * | 11/1997 | Barnsby et al. | 475/331 |
| 6,195,895 B1 * | 3/2001 | Wuester et al. | 29/898.02 |
| 6,223,616 B1 * | 5/2001 | Sheridan | 74/468 |
| 2003/0153427 A1 * | 8/2003 | Mayranen | 475/331 |

* cited by examiner

Primary Examiner—William H. Rodriguez
(74) Attorney, Agent, or Firm—Bachman & LaPointe, P.C.

(57) ABSTRACT

A planet gear journal for an epicyclic gear system is asymmetrically formed to compensate for carrier twist. The asymmetry may be between a pair of opposed outwardly open annular channels inboard of a bearing surface of the journal. A particular application is the planetary gear system of a geared turbofan engine.

21 Claims, 4 Drawing Sheets

TURBOFAN ENGINE COMPRISING AN SPICYCLIC TRANSMISSION HAVING BEARING JOURNALS

BACKGROUND OF THE INVENTION (1) Field of the Invention

This invention relates to transmissions, and more particularly to geared turbofan engines.

(2) Description of the Related Art

In high bypass turbofan engines it is advantageous that the turbine drive the fan through a reduction gearing system. This permits the turbine to operate at the relatively high speeds at which it is efficient while the much larger diameter fan operates at the relatively lower speeds at which it is efficient. Possible gearing systems include epicyclic systems. In an exemplary planetary implementation, the turbine shaft directly drives a sun gear. A number of planet gears are enmeshed between the sun gear and a ring gear that is non-rotating relative to an engine nacelle or other environmental structure in which the engine is mounted. The fan is directly driven by a carrier cage holding the planet gears. Bearings are typically provided: (a) for supporting the turbine shaft and sun gear relative to the environment; and (b) for rotatably supporting the planetary gears relative to the carrier. Whereas the former are often rolling-element bearings, the latter are advantageously journal bearings. Journal bearings may offer an advantageous balance of compactness and load-carrying ability.

In a common configuration, first and second end portions (front and rear for ease of reference) of each journal are mounted in front and rear portions of the carrier. In a basic configuration, the front and rear portions are separate plates coupled to each other by the journals and the front plate is, in turn, coupled to the fan. Under load, there may be a torsional twist of the front plate relative to the rear plate causing a journal axes to twist out of parallel with the engine axis. This misalignment can damage the gears as is noted in U.S. Pat. No. 5,466,198, the disclosure of which is incorporated by reference herein in its entirety as if set forth at length. The '198 patent teaches use of a torque frame system to prevent carrier twist. Alternatively, U.S. Pat. No. 5,102,379 teaches the presence of undercuts or annular compartments in front and rear faces of the journal to permit flexing of distal portions of the journal bearing surface relative to a journal centerline to at least partially accommodate radial loading on journals.

BRIEF SUMMARY OF THE INVENTION

Accordingly one aspect of the present invention involves an epicyclic transmission wherein a planet gear carrier has first and second portions respectively supporting planet gear journals on first and second sides. Each journal has an outer portion extending between first and second outer rims and an inner portion extending between first and second ends. A transition portion joins the inner and outer portions and has first and second ends respectively forming bases of first and second compartments open in opposite first and second directions. The compartments are asymmetric to each other. Advantageously, the asymmetry serves to control journal lubricant film thickness in response to carrier twist.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
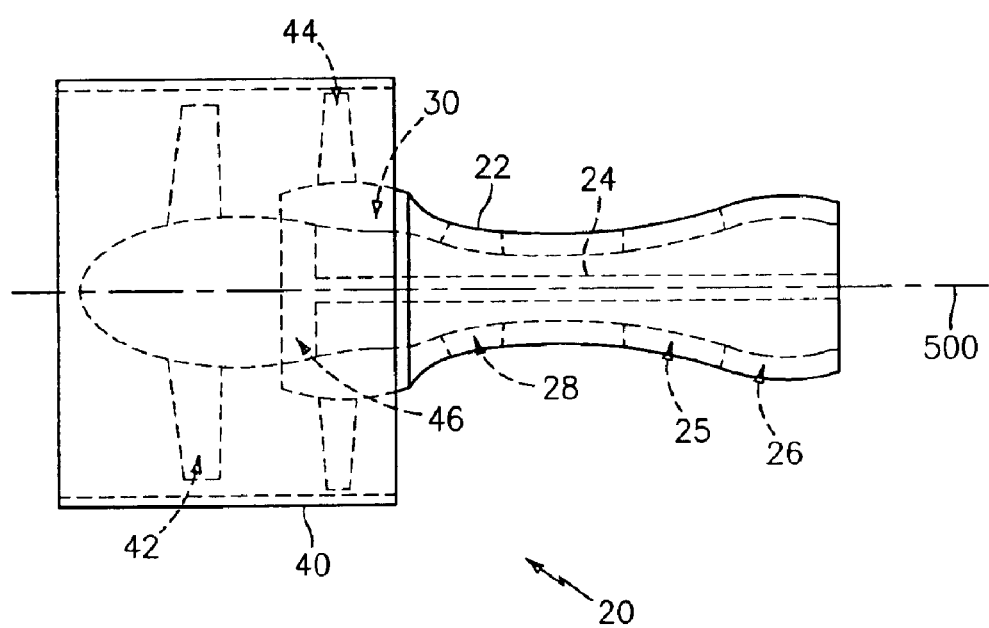
FIG. 1 is a schematic longitudinal view of a geared turbofan engine.

FIG. 1 shows a geared turbofan engine 20 having a main housing 22 containing a rotor shaft assembly 24. An exemplary engine is a high-bypass turbofan. In such an engine, the normal cruise condition ratio of air mass flowing outside the core (e.g., the compressor sections and combustor) to air mass passing through the core (the bypass ratio) is typically in excess of 4.0 and, more narrowly, typically between 4.0 and 8.0. Via high and low shaft portions of the shaft assembly 24, high and low turbine sections 25 and 26 drive high and low compressor sections 28 and 30. The engine extends along a longitudinal axis 500 from a fore end to an aft end. Adjacent the fore end, a shroud 40 encircles a fan 42 and is supported by vanes 44. The low shaft portion of the rotor shaft assembly 24 drives the fan 42 through a reduction transmission 46. An exemplary reduction transmission is a planetary gear system.

Figure 2:
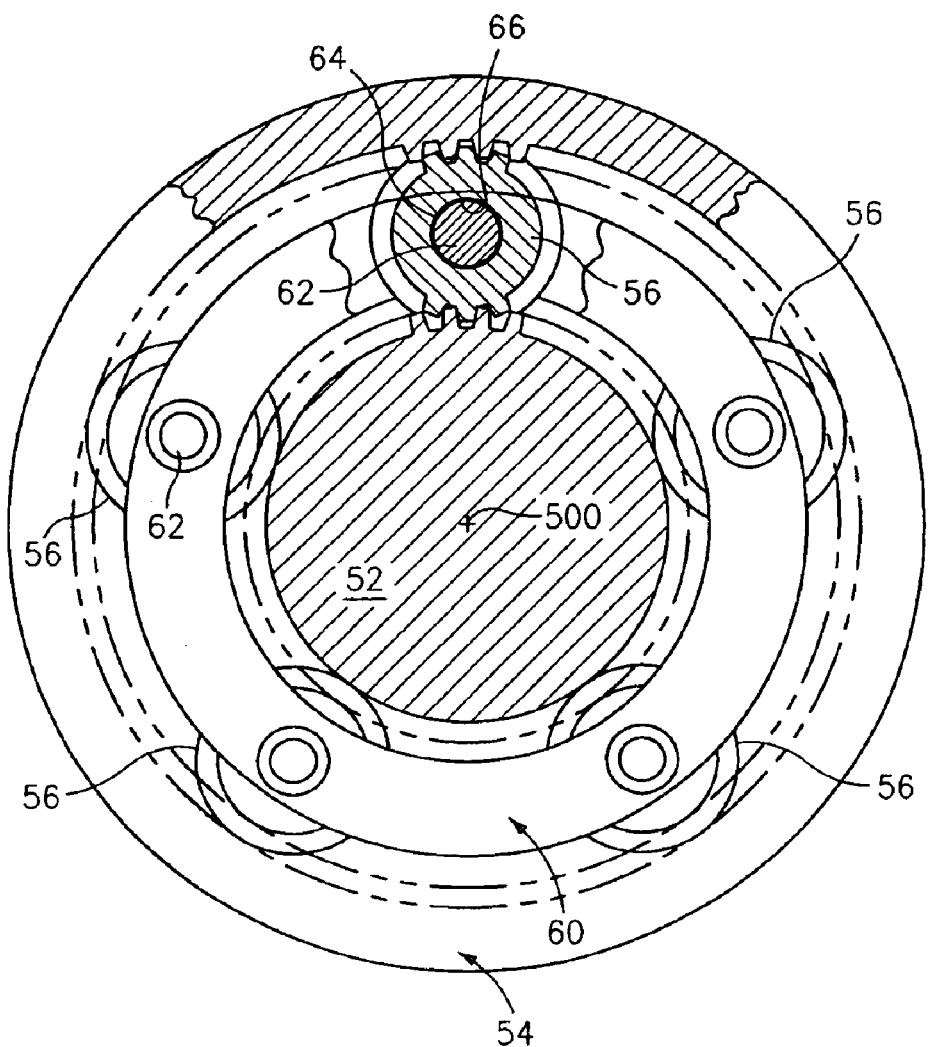
FIG. 2 is a transverse schematic cutaway view of the transmission of the engine of FIG. 1.

FIG. 2 schematically shows details of the transmission 46. A forward end of the rotor shaft assembly is coupled to a sun gear 52. The externally-toothed sun gear is encircled by an internally-toothed ring gear 54 which is substantially irrotatably mounted relative to the housing 22. A number of externally-toothed planet gears 56 are positioned between and enmeshed with the planet gear and ring gear.

A cage or planet carrier assembly 60 carries the planet gears via associated journals 62. The journals have circumferential surface portions 64 closely accommodated within internal bore surfaces 66 of the associated planet gears. The speed reduction ratio is determined by the ratio of diameters of the ring gear to the sun gear. This ratio will substantially determine the maximum number of planet gears in a given ring. The actual number of planet gears will be determined by stability and stress/load sharing considerations. An exemplary reduction is between 2:1 and 13:1. An exemplary number of planet gears is between 3 and 11. FIG. 2 shows the equally-spaced positioning of five planet gears 56 about the sun gear 52.

Figure 3:
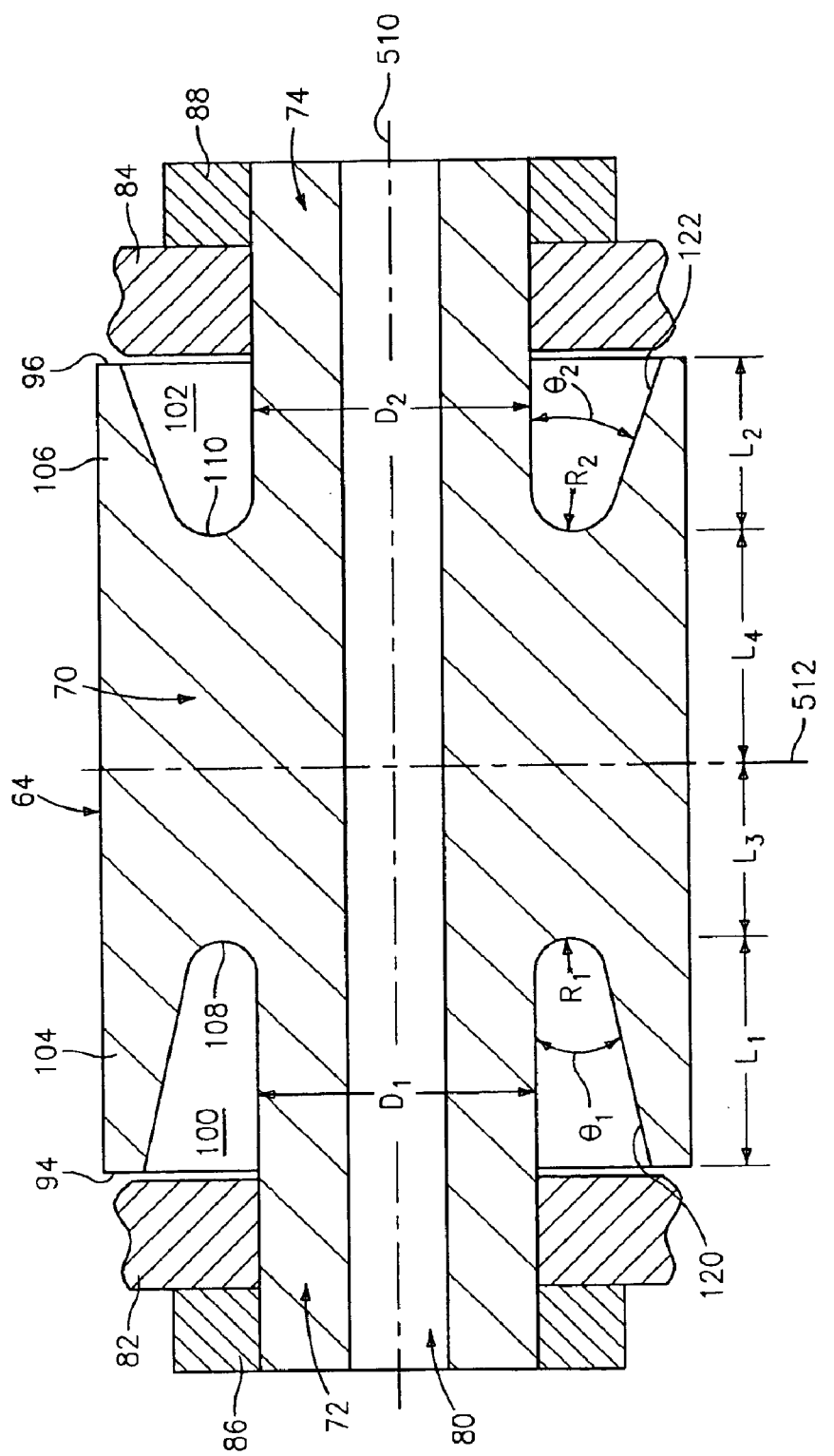
FIG. 3 is a longitudinal semi-schematic sectional view of a journal of the transmission of FIG. 2.
Figure 4:
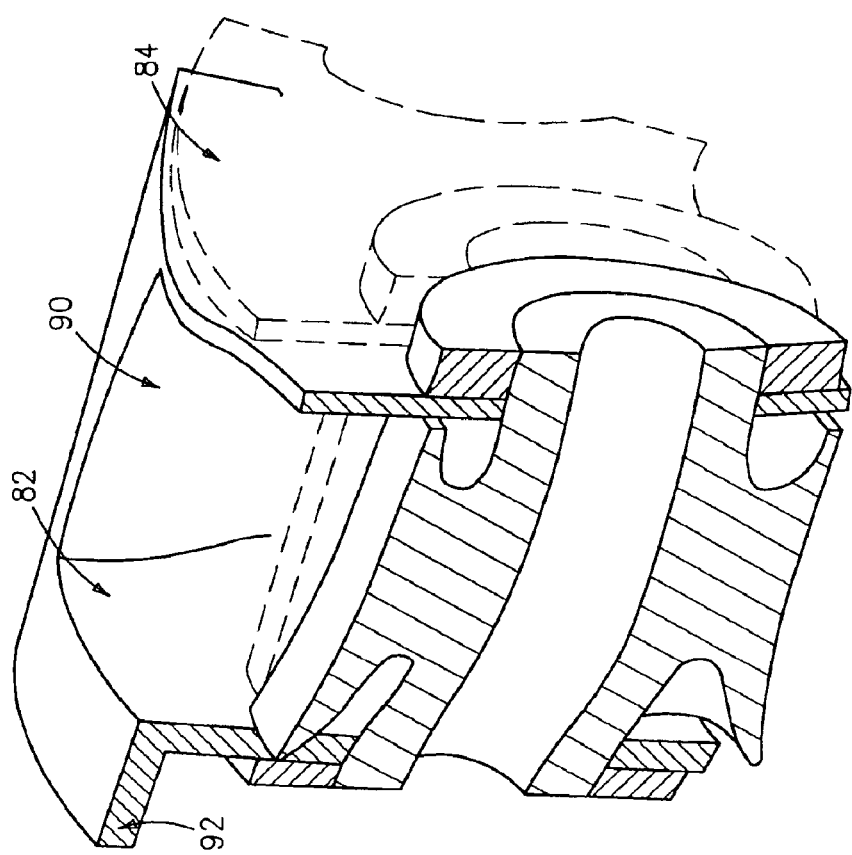
FIG. 4 is a deformed longitudinal radial sectional view of a journal and carrier under load.

FIGS. 3 and 4 show additional structural details of an exemplary carrier 60 and journal or pin 62. The exemplary journal comprises the unitary combination of a central section 70 and shaft sections 72 and 74 extending from ends of the central section. The surface portion 64 is formed along the central section 70. A central bore 80 may extend inward from the outboard ends of the shaft sections 72 and 74. Distal end portions of the shaft sections 72 and 74 are secured to carrier plates 82 and 84 via nuts 86 and 88. FIG. 4 shows the journal and carrier under load (an unloaded condition being shown in broken lines). Alternatively described, the shaft sections and inboard portion of the central section form an inner portion of the journal extending between distal ends of the shaft section. An outer portion of the central section extending to the surface portion 64 forms an outer portion of the journal and a radially intermediate portion of the central section forms a transition portion between inner and outer portions. FIG. 4 further shows the carrier plates 82 and 84 joined by one of a plurality of webs 90 alternatingly positioned between journals. The webs along with the journals provide torsional coupling between the carrier plates. In the exemplary embodiment, the first carrier plate 82 is the main or loaded plate which, in the exemplary engine embodiment is coupled to the fan. The second plate 84 is free or unloaded. Accordingly, the first plate 82 is generally more robust and provided with a feature 92 for coupling to the fan.

Returning to FIG. 3, the central section 70 and its surface portion 64 extend from a first rim 94 to a second rim 96 at respective first and second ends of the central section. First and second annular compartments or channels 100 and 102 extend longitudinally inward from the first and second ends between respective collar (wing when viewed in section) portions 104 and 106 of the central section 70 and the respective shaft sections 72 and 74. The channels have longitudinally inboardmost portions or bases 108 and 110 defining channel depths $L_1$ and $L_2$ relative to their associated rims. In the exemplary embodiment, the channels have radially inboard surfaces substantially formed by generally cylindrical portions of the associated shafts having diameters $D_1$ and $D_2$. Radially outboard surfaces 120 and 122 are generally frustoconical, having concave transitions to the inboard surfaces at the channel bases. The outboard surfaces are at exemplary angles $\theta_1$ and $\theta_2$ relative to the inboard surfaces and central longitudinal axis 510. For further reference, the channel bases are at respective distances $L_3$ and $L_4$ from a transverse centerplane 512 of the central section 70. In the exemplary embodiment, the channel bases 108 and 110 have respective sectional radii of curvature $R_1$ and $R_2$. These radii may be constant or vary.

In the exemplary embodiment, the channels are asymmetric. This may involve asymmetries in one or more of the identified parameters or other shape factors. In the illustrated embodiment, the depth $L_1$ is substantially larger than the depth $L_2$. An exemplary ratio of these depths is between 1.3:1 and 5:1 (more narrowly, between 1.5:1 and 3:1). In an exemplary implementation, the diameters $D_1$ and $D_2$ are 1.42 inch and the central bore diameter is 0.68 inch. The bearing surface 64 is at a radius of 1.11 inch and has a length of 2.36 inches. The channel depths $L_1$ and $L_2$ are 0.81 inch and 0.43 inch, respectively. The radii of curvature $R_1$ and $R_2$ are 0.10 and 0.15 inch, respectively. Inboard radii of the surfaces 94 and 96 are 1.11 inch and 1.07 inch, respectively. The angle $\theta_2$ is approximately a constant 12° whereas the angle $\theta_1$ is approximately halfway divided between an inboard 12° portion and an outboard 20° portion so that the surface 120 is substantially bi-frustoconical. These asymmetries in channel depth and the thickness profile of the collar portions permit control of load performance (e.g., flexibility) of portions of the systems including the portions of the shaft sections within the channels and the collar portions of the central section. In view of (or in combination with) carrier and planet gear properties, the asymmetries may be optimized to provide advantageous performance parameters. Notable parameters involve performance under load, especially high max. power (e.g., takeoff) loads normally associated with carrier twist.

FIG. 4 shows the deformation of the radial (relative to the axis 500) longitudinal section of the journal and carrier under load. The load on the journal represents a complex combination of forces. These are often discussed as including a beam-bending effect caused by local film pressure from the planet gear and gear forces associated with torque transmission. The presence of two symmetric channels in the prior art tends to address the former whereas the latter is typically addressed via use of a torque frame. The present asymmetries can be utilized in the absence of a torque frame to address torsion. In the illustrated embodiment, the greater depth of the first channel tends to concentrate twisting along the first shaft section 72. A desired result of the asymmetry is to maintain a minimum lubricant film thickness between the surface 64 and mating planet gear surface above a targeted critical value under the presented operating conditions (whether transient or steady state). Accordingly, as discussed above the properties of both the planet gears and the carrier may be relevant to the optimization of journal properties.

Diverse journal structures are known and may be developed, and the principles of the present invention may be applied to various such journals. For example, journals engineered according to principles of the present invention may be used as drop-in replacements for existing journals, in which cases their configuration may be influenced by the remainder of the existing transmission.

The journal and gear are typically made of steel. Both may be made of the same steel, which is typically case-hardened by carburization. Commonly used steels include AMS 6265 and AMS 6308. In an exemplary embodiment, the surfaces 66 are formed by or covered with a bearing material such as a soft metal coating. In the exemplary embodiment, the surfaces 64 are covered with a lubricous coating. Advantageously the coating is of a solid film coating material.

The optimization of the parameters to achieve a desired deformation may be iteratively resolved on an embodiment of the transmission's design. Such embodiment may be a physical embodiment such as an actual transmission or engine, a partial transmission, or a model appropriately scaled for simulation purposes, or may be in the form of a computer simulation. In such an iterative design process, for a given journal geometry under the anticipated conditions the resulting effect on film thickness and/or other factors are observed. The parameters of channel asymmetry may be varied and the simulation repeated until the factors are within specific desired ranges.

One or more embodiments of the present invention have been described. Nevertheless, it will be understood that various modifications may be made without departing from the spirit and scope of the invention. For example, assemblies may replace individual parts or vice versa. The principles may be applied both to various existing engines and transmissions and engines and transmissions yet to be developed. Accordingly, other embodiments are within the scope of the following claims.

What is claimed is:

1. An epicyclic transmission comprising:

a sun gear;

a plurality of planet gears meshed with the sun gear;

a ring gear surrounding and meshed with the planet gears;

a plurality of journals, each journal carrying at least an associated one of the planetary gears and having a central longitudinal axis defining opposite first and second directions; and a gear carrier having a first and second portions respectively supporting the journals on first and second sides of the planet gears, wherein each said journal has:

an outer portion extending from a first outer rim to a second outer rim of said outer portion;

an inner portion extending from a first end to a second end of said outer portion; and a transition portion joining the inner and outer portions, the transition portion having first and second ends, respectively forming bases of first and second compartments open in the first and second directions, the first and second compartments being asymmetric to each other.

2. The transmission of claim 1 wherein the plurality of journals provide a portion of a torsional coupling between the first and second gear carrier portions.

3. The transmission of claim 1 wherein the second compartment is deeper than the first compartment.

4. The transmission of claim 1 wherein the gear carrier does not have a torque frame coupling.

5. A turbofan engine comprising:

a turbine;

a fan; and the transmission of claim 1 coupling the turbine to the fan to permit the turbine to drive the fan with a reduction.

6. The turbofan engine of claim 5 wherein the fan is forward of the turbine and has an operative bypass ratio of at least 4.0.

7. An epicyclic transmission comprising:

a sun gear receiving an input power;

a plurality of planet gears meshed with the sun gear;

a ring gear surrounding and meshed with the planet gears;

a plurality of journals, each journal carrying at least an associated one of the planetary gears and having a central longitudinal axis defining opposite first and second directions; and a gear carrier having a first and second portions respectively supporting the journals on first and second sides of the planet gears, the first portion coupling the carrier to a load to deliver an output power or react a torque, wherein each said journal has:

an outer portion extending from a first outer rim to a second outer rim of said outer portion;

an inner portion extending from a first end to a second end of said inner portion; and means for joining the outer and inner portions and controlling planet gear to journal film thickness in response to carrier twist.

8. The transmission of claim 7 wherein said means comprises a transition portion joining the inner and outer portions, the transition portion having first and second ends, respectively forming bases of first and second compartments open in the first and second directions, the first and second compartments being asymmetric to each other.

9. A journal having:

a central longitudinal axis defining opposite first and second directions;

an outer portion extending from a first outer rim to a second outer rim of said outer portion;

an inner portion extending from a first end longitudinally beyond the first outer rim to a second end of said inner portion longitudinally beyond the second outer rim; and a transition portion joining the inner and outer portions, the transition portion having first and second ends, respectively forming bases of first and second compartments open in the first and second directions, the first and second compartments being continuous annular channels asymmetric to each other.

10. The journal of claim 9 wherein the first compartment has a first depth from the first outer rim and the second compartment has a second depth from the second outer rim, the second depth being greater than the first depth.

11. The journal of claim 9 wherein the inner portion has a central bore.

12. A method for optimizing the configuration of a gear-carrying bearing journal in an epicyclic gear system to provide desired gear to journal film thickness upon carrier twist, the method comprising the steps of:

inducing carrier twist in the journal under pre-determined operating conditions;

observing film thickness associated with the carrier twist; and repeating the steps of:

revising the configuration by varying at least one parameter of a longitudinal asymmetry of the journal;

inducing said carrier twist in the journal; and observing film thickness of the journal associated with the carrier twist, until the film thickness associated with a particular revised configuration falls within a desired range.

13. The method of claim 12 performed as a computer simulation.

14. The method of claim 12 wherein said varying includes varying relative depth of first end second channels extending longitudinally inward and radially inboard of a bearing surface of the journal.

15. The method of claim 12 wherein said varying includes varying relative diameter of first and second journal shaft portions radially inboard of first and second annular channels in the journal.

16. The method of claim 12 wherein said varying includes varying thickness profiles of first and second journal portions radially outboard of first and second annular channels in the journal.

17. The method of claim 12 wherein said varying includes varying an asymmetry of first and second compartments in respective first and second longitudinal ends of the journal.

18. An engine comprising:

a turbine;

a fan; and a transmission coupling the turbine to the fan to permit the turbine to drive the fan with a reduction and comprising:

a sun gear;

a plurality of planet gears meshed with the sun gear;

a ring gear surrounding and meshed with the planet gears;

a plurality of journals, each journal carrying at least an associated one of the planetary gears and having a central longitudinal axis defining opposite first and second directions; and a gear carrier having a first and second portions respectively supporting the journals on first and second sides of the planet gears, wherein each said journal has:

a central longitudinal axis defining opposite first and second directions;

an outer portion extending from a first outer rim to a second outer rim of said outer portion;

an inner portion extending from a first end to a second end of said inner portion; and a transition portion joining the inner and outer portions, the transition portion having first and second ends, respectively forming bases of first and second compartments open in the first and second directions, the first and second compartments being asymmetric to each other.

19. The engine of claim 18 wherein the fan is forward of the turbine.

20. The engine of claim 18 wherein the fan is forward of the turbine and has an operative bypass ratio of at least 4.0.

21. The engine of claim 18 wherein the gear carrier does not have a torque frame coupling.

* * * * *

UNITED STATES PATENT AND TRADEMARK OFFICE
CERTIFICATE OF CORRECTION

PATENT NO. : 6,964,155 B2  Page 1 of 1
APPLICATION NO. : 10/334020
DATED : November 15, 2005
INVENTOR(S) : Michael E. McCune and Loc Duong It is certified that error appears in the above-identified patent and that said Letters Patent is hereby corrected as shown below:

Title page (54) reads as follows "A Turbofan Engine Comprising A Spicyclic Transmission Having Bearing Journals". It should read --A Turbofan Engine Comprising A Epicyclic Transmission Having Bearing Journals--.

Signed and Sealed this

Nineteenth Day of December, 2006

JON W. DUDAS
*Director of the United States Patent and Trademark Office*